Patented Jan. 1, 1952

2,581,008

UNITED STATES PATENT OFFICE 2,581,008

OXA-GLYCOL DILEVULINATES

William S. Emerson and Raymond I. Longley, Jr., Dayton, Ohio, assignors to Monsanto Chemical Company, St. Louis, Mo., a corporation of Delaware No Drawing. Application August 14, 1948, Serial No. 44,406

4 Claims. (Cl. 260—483)

This invention relates to esters having unusually desirable properties as plasticizers for various resinous compositions. More specifically the invention relates to esters of long chain ether glycols and levulinic acid.

The primary purpose of this invention is to provide new effective plasticizers having unusually low temperature characteristics which are retained by the resinous composition over a wide range of conditions. A further purpose of this invention is to provide new and improved plastic compositions, particularly plasticized polyvinyl acetals.

The new plasticizing compositions are esters having the structural formula:

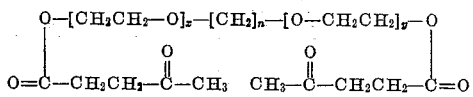

in which $x$ and $y$ are small whole numbers from zero (0) to three (3), inclusive, the sum of $x$ and $y$ is a small whole number from one (1) to three (3), inclusive, and $n$ is a small number from four (4) to six (6), inclusive.

The new compounds are esters of two moles of levulinic acid and one mole of a glycol such as glycols made by the condensation of ethylene oxide with tetramethylene glycol, hexamethylene glycol, and pentamethylene glycol, 3-oxa-1,7-heptanediol, a mixture of 3,8-dioxa-1,10-decanediol, and 3,6-dioxa-1,10-decanediol, 3-oxa-1,8-octanediol, 3-oxa-1,9-nonanediol, a mixture of 3,9-dioxa-1,11-hendecanediol, and 3,6-dioxa-1,11-hendecanediol, and other similar glycols and glycol mixtures made by the condensation of ethylene oxide with the higher polymethylene glycols.

Example 1

A reaction flask provided with a reflux condenser, a thermometer, and an ethylene oxide inlet tube was charged with 770 grams of tetramethylene glycol and one per cent of potassium hydroxide. While maintaining the contents of the flask at a temperature between 110 and 135° C., ethylene oxide was introduced gradually until one-third of a molar equivalent had been absorbed. The alkali was then neutralized by bubbling in carbon dioxide and the resulting reaction mass was distilled. A substantial portion of product boiling at 158° C. at 16 mm. was recovered and identified as 3-oxa-1,7-heptanediol.

Example 2

Using the apparatus described in the preceding example, 500 grams of pentamethylene glycol was treated with ethylene oxide. Upon the distillation of the resulting reaction mass a fraction boiling at 142 to 146° C. at 0.5 mm. pressure was separated and identified as a mixture of 3,6-dioxa-1,11-hendecanediol and 3,9-dioxa-1,11-hendecanediol.

Example 3

Using the apparatus described in Example 1, 1856 grams of pentamethylene glycol was mixed with one per cent of potassium hydroxide and 785 grams of ethylene oxide was gradually introduced. While still hot the reaction mass was neutralized with carbon dioxide and the product distilled. The product boiling between 145 and 195° C. at 11 mm. pressure was identified as a mixture of 3-oxa-1,8-octanediol, 3,6-dioxa-1,11-hendecanediol and 3,9-dioxa-1,11-hendecanediol.

Example 4

Using the procedure and apparatus described in Example 1, a 360 gram quantity of tetramethylene glycol was mixed with 3.6 grams of potassium hydroxide and thereafter 197 grams of ethylene oxide was gradually introduced. After neutralization the product was distilled and the fraction boiling between 186 and 191° C. at 16 mm. pressure was identified as a mixture of 3,6-dioxa-1,10-decanediol and 3,8-dioxa-1,10-decanediol. The same experiment also produced a substantial portion of 3-oxa-1,7-heptanediol.

The new esters may be prepared by mixing the glycol with two moles of levulinic acid and heating the mixture until reaction is effected. The reactions may involve the use of an esterification catalyst, such as sulfuric acid, p-toluene sulfonic acid or benzene sulfonic acid, and preferably by heating at the reflux temperature of a nonaqueous reaction mass. The water evolved during the esterification is removed from the condensate by means of a suitable separatory device, for example a Dean and Stark trap.

The new plasticizers are useful in softening compositions, such as polyvinyl acetate, cellulose esters and ethers, and copolymers of vinyl chloride, particularly the copolymers of more than 70 per cent of vinyl chloride and up to 30 per cent of other polymerizable monomers, for example, vinyl acetate, ethyl maleate and ethyl fumarate.

The new plasticizers may be blended with the resin in any conventional manner, for example, by mixing on a roll mixer, or in a Banbury type mixer, or with any other suitable mixing device. The plasticizers are used in proportions necessary to achieve the desired plasticity. Although the quantity of plasticizer will depend upon the particular polymer to be plasticized and upon its molecular weight, it is generally found that from 5 to 50 per cent of plasticizer will produce satisfactory compositions for general utility. Such quantity of plasticizer will generally remain as a permanent part of the resin and the modified resins so prepared will not deteriorate or become embrittled by reason of the loss of the plasticizer during use.

The value of the plasticizers may be estimated by means of three tests, (1) compatibility (2) volatility and (3) Clash-Berg flex temperatures. The compatibility is determined by visual inspection, clarity being a requisite in most applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about −50° C. and observing the change in the modulus of rigidity as the sample warms up to room temperature, the flex temperature being that at which the modulus of rigidity is 135,000 pounds per square inch. Of these tests the compatibility is of primary importance, while the others are only critical for certain applications. If the polymer is to be subject to outside weather conditions flex temperatures of −20 to −30° C. are desirable, otherwise 0° C. is satisfactory. If the polymer is to be subjected to elevated temperatures a volatility of 5 to 10 per cent is advantageous, otherwise volatilities as high as 25 per cent are often not objectionable. The volatilities and flex temperature of polymer plasticizer blends are difficult to predict and often have no apparent relationship to the physical constants of the plasticizer.

Further details of the practice of this invention are set forth with respect to the following specific examples:

*Example 5*

A reaction flask provided with a reflux condenser and a Dean and Stark trap for removal of the evolved water from the condensate was charged with 113 grams of levulinic acid, 50 grams of 3-oxa-heptamethylene glycol and 60 ml. of toluene. After refluxing 16 hours the reaction was substantially complete. After cooling, the reaction mass was processed by diluting with an equal volume of benzene, washing with dilute aqueous sodium hydroxide, washing with water and distilling. The product distilling at 201 to 209° C. at 0.4 mm. pressure was identified as 3-oxa-1,7-heptanediol dilevulinate.

The new ester was compounded was polyvinyl chloride in the amount of 40 per cent by weight and the flex temperature and volatility determined by the above-described methods. It was found to have a low flex temperature of −45° C. and a good competitive volatility of 6.7 per cent.

The invention is defined by the following claims.

We claim:
1. Esters having the structural formula:

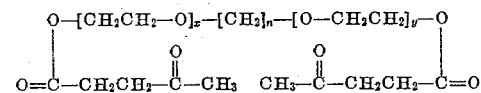

in which $x$ and $y$ are small whole numbers from zero (0) to three (3), inclusive, the sum of $x$ and $y$ is a small whole number from one (1) to three (3), inclusive, and $n$ is a small number from four (4) to six (6), inclusive.

2. 3-oxa-1,7-heptanediol dilevulinate.
3. 3-oxa-1,8-octanediol dilevulinate.
4. 3-oxa-1,9-nonanediol dilevulinate.

WILLIAM S. EMERSON.
RAYMOND I. LONGLEY, Jr.

REFERENCES CITED

The following references are of record in the file of this patent:

UNITED STATES PATENTS

| Number | Name | Date |
|---|---|---|
| 2,004,115 | Izard | June 11, 1935 |